United States Patent
Kitayama et al.

[11] Patent Number: 5,130,113
[45] Date of Patent: Jul. 14, 1992

[54] ALUMINUM HYDROXIDE, PROCESS FOR PREPARATION THEREOF AND COMPOSITION

[75] Inventors: Mikito Kitayama; Kazuyuki Yokoo; Yukio Oda; Yasuo Kawai; Mitsuhiko Morihira; Osamu Morooka, all of Yokohama; Yuji Shibue, Tokyo, all of Japan

[73] Assignee: Showa Denko K.K., Tokyo, Japan

[21] Appl. No.: 566,474

[22] PCT Filed: Oct. 31, 1989

[86] PCT No.: PCT/JP89/01123
§ 371 Date: Aug. 22, 1990
§ 102(e) Date: Aug. 22, 1990

[87] PCT Pub. No.: WO90/08737
PCT Pub. Date: Aug. 9, 1990

[30] Foreign Application Priority Data

Jan. 26, 1989 [JP] Japan .................. 1-19244
Jul. 19, 1989 [JP] Japan .................. 1-187080

[51] Int. Cl.⁵ .................. C01F 7/02; C04B 22/06
[52] U.S. Cl. .................. 423/629; 501/153; 524/437
[58] Field of Search .......... 423/629, 625; 524/437; 501/153

[56] References Cited

U.S. PATENT DOCUMENTS

| | | | |
|---|---|---|---|
| 4,251,430 | 2/1981 | Kennedy-Skipton et al. | 423/625 |
| 4,340,579 | 7/1982 | Greber et al. | 423/625 |
| 4,574,074 | 3/1986 | Cristol et al. | 423/629 |
| 4,755,374 | 7/1988 | Martin et al. | 423/629 |
| 4,801,639 | 1/1989 | Hoshi et al. | 524/437 |

FOREIGN PATENT DOCUMENTS

| | | | |
|---|---|---|---|
| 118031 | 9/1984 | European Pat. Off. | 423/629 |
| 1068233 | 4/1958 | Fed. Rep. of Germany | 423/629 |
| 3500284 | 1/1991 | Japan . | |

Primary Examiner—John Niebling
Assistant Examiner—Brian M. Bolam
Attorney, Agent, or Firm—Sughrue, Mion, Zinn, Macpeak & Seas

[57] ABSTRACT

Aluminum hydroxide having a particle size of 2 to 30 μm and having small specific surface area and low resin filling viscosity can be prepared by using precipitated aluminum hydroxide composed of secondary agglomerated particles having a primary particle size almost equal to the desired average particle size of intended pulverized aluminum hydroxide as the starting material to be pulverized and pulverizing this starting aluminum hydroxide. This aluminum hydroxide has an average particle size of 2 to 30 μm, a surface roughness coefficient Sr/Sc (in which Sr represents the specific surface area of particles measured by the nitrogen adsorption method and Sc represents the specific surface area calculated from the size of particles approximated to spheres while taking the particle size distribution of particles into consideration) smaller than 2.5 and a linseed oil absorption smaller than 30 cc/100 g as determined according to JIS K-5101.

16 Claims, 8 Drawing Sheets ns approximately to spheres while taking the

ALUMINUM HYDROXIDE, PROCESS FOR PREPARATION THEREOF AND COMPOSITION

TECHNICAL FIELD

The present invention relates to aluminum hydroxide which is suitably used as a resin filler, a process for the preparation thereof, and a resin composition comprising this aluminum hydroxide as a filler. This resin composition is especially directed to an artificial marble product and a printed circuit board.

BACKGROUND ART

It is known that aluminum hydroxide can be used as a resin filler. Especially, it is well-known that aluminum hydroxide is filled in an unsaturated polyester resin or an acrylic resin and an onyx-like or marble-like molded article is prepared from the resin composition. Aluminum hydroxide is expressed by the chemical formula of $Al(OH)_3$ or $Al_2O_3.3H_2O$, and at a temperature higher than 200° C., water vapor is released from the interior of the crystal and a large endothermism is shown at this point. Accordingly, if aluminum hydroxide is used as a resin filler, an excellent flame retardancy can be obtained. Moreover, aluminum hydroxide has an excellent reduced fuming property, an excellent arc resistance, and an excellent tracking resistance, and the manufacturing cost is low. Accordingly, aluminum hydroxide can be regarded as a very valuable flame retardant.

Recently, to improve the surface smoothness, the boiling resistance, the flame retardancy, and the sedimentation resistance in the best state, aluminum hydroxide having a fine particle size has been used.

When obtaining a molded article by press-molding BMC (bulk molding compound) or SMC (sheet molding compound), the use of aluminum hydroxide having a fine particle size advantageously prevents the separation of the filler from the resin at the pressing step. Accordingly, aluminum hydroxide having a particle size reduced by pulverization is widely used as a resin filler. In pulverized aluminum hydroxide, however, the crystals is destroyed and large quantities of fine particles formed by chipping are contained, and the specific surface area of the powder is large, and accordingly, a problem of a large moisture adsorption arises. In some applications, the use of aluminum hydroxide having a large moisture adsorption as a filler results in problems such as an insufficient dispersion of the filler, insufficient curing of the resin, reduction of the hardness of the molded article, insufficient insulating properties and foaming at the kneading step, and thus the use of this aluminum hydroxide is not preferable in some cases. Generally, with respect to a pulverization product, the finer the filler, the larger the oil absorption of the filler, and the filling of the filler into the resin at a high ratio becomes difficult.

Furthermore, an unsaturated polyester resin comprising aluminum hydroxide having a large specific surface area as a filler involves problems in that an oil-soluble curing promoter such as cobalt naphthenate is trapped on the surface of aluminum hydroxide, with the result that the gel time is delayed, the productivity is reduced, and the molded article is yellowed.

These problems are solved to some extent by surface-treating pulverized aluminum hydroxide with a surface-treating agent such as stearic acid, a metal salt thereof or a silane coupling agent, but this surface treatment results in increased costs.

A process has long been known in which aluminum hydroxide having a fine particle size is precipitated by using an alumina gel disclosed in U.S. Pat. No. 2,549,549 or French Patent No. 2,041,750 as a precipitation-inducing material. Fine aluminum hydroxide prepared according to this process has a smaller specific surface area than that of pulverized aluminum hydroxide having a similar particle size and the water adsorption is smaller. This aluminum hydroxide, however, is in the form of secondary particles formed by an agglomeration of fine primary particles and has a very large oil absorption. Accordingly, it is very difficult to fill aluminum hydroxide as a filler in an amount sufficient to impart a required flame retardancy to a resin. Japanese Unexamined Patent Publication No. 59-501711 discloses a process for precipitating aluminum hydroxide having a fine particle size by using pulverized aluminum hydroxide as a precipitation-inducing material. It has been also found that aluminum hydroxide obtained according to this process has a very large oil absorption.

DISCLOSURE OF THE INVENTION

The inventor carried out research into the foregoing problems, and as a result, found that the primary particle size of precipitated aluminum hydroxide as the material to be pulverized has a very large influence on the specific surface area of the pulverization product and the resin filling viscosity. The present invention is based on this finding.

More specifically, the present invention provides aluminum hydroxide having a small specific surface area and a low resin filling viscosity, a process for preparing aluminum hydroxide as a resin filler by using precipitated aluminum hydroxide composed of secondary particles formed by agglomeration of primary particles having a primary particle size substantially equal to the average particle size of intended pulverized aluminum hydroxide, and a resin composition filled with this aluminum hydroxide having a small specific surface area and a low resin filling viscosity.

BEST MODE OF CARRYING OUT THE INVENTION

Figure 1:
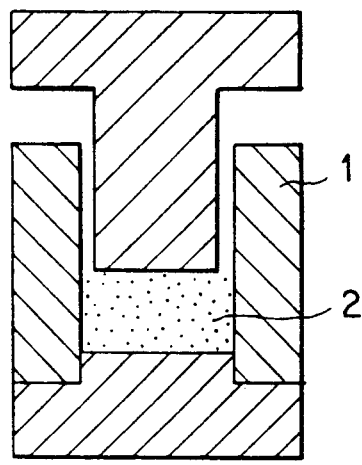
FIG. 1 is a sectional view showing a mold used in the press disintegration method for measuring the average particle size of primary particles.

In accordance with a first aspect of the present invention, aluminum hydroxide provided for a resin filler is characterized by (i) an average particle size of 2 to 30 μm, (ii) a surface roughness coefficient Sr/Sc (in which Sr represents the specific surface area of particles measured by the nitrogen adsorption method and Sc represents the specific surface area calculated from the size of particles approximating to spheres while taking the particle size distribution of particles into consideration) smaller than 2.5, and (iii) a linseed oil absorption smaller than 30 cc/100 g as determined according to JIS K-5101.

The average particle size of aluminum hydroxide of the present invention is within the range of from 2 to 30 μm. This average particle size is measured by the sedimentation method. The sedimentation method is a method in which particles are dispersed and sedimented in an appropriate medium and the particle size is determined from the relationship between the particle size and the sedimentation speed. Aluminum hydroxide of the present invention is mainly applied to uses corresponding to 2 or 3 classes of the particle size, although the applicable uses are not limited to these uses. The main use of aluminum hydroxide having a particle size of 4 to 30 μm is for an artificial marble article, but as the average particle is reduced, the transparency tends to degrade. Accordingly, aluminum hydroxide having an average particle size of 8 to 30 μm is preferably used for an artificial onyx article and aluminum hydroxide having an average particle size of 4 to 8 μm is preferably used for an artificial marble article. The main use of aluminum hydroxide having an average particle size of 2 to 8 μm is for a printed circuit board. If the average particle size is larger than 30 μm, the resin filling viscosity increases and the stringing property becomes poor. Accordingly, when an artificial marble article having a flow pattern is prepared by the cast molding method, the flow pattern is often cut midway, and the strength and surface smoothness of the molded article are degraded. Furthermore, it is difficult to prevent the separation of the filler from the resin at the press molding of BMC and SMC. On the other hand, if the average particle size is smaller than 4 μm, the transparency of the filled resin is reduced and the filled resin is not suitable for the production of an artificial marble article. The average particle size of aluminum hydroxide as a filler for a printed circuit board is preferably 2 to 8 μm. If the average particle size is smaller than 2 μm, the oil absorption is too large and the filler cannot be filled at a high ratio. Furthermore, defects such as an increase of the specific surface area and increase of the moisture adsorption are caused. If the average particle size is larger than 8 μm, the problem of a sedimentation of particles arises. From the viewpoint of preventing sedimentation, preferably the average particle size is up to 4 μm.

Aluminum hydroxide for a resin filler according to the present invention is characterized in that the surface roughness coefficient Sr/Sc is smaller than 2.5, preferably smaller than 2. The surface roughness coefficient referred to herein represents the ratio of the specific surface area Sr of the particles measured by the nitrogen adsorption method (BET method) to the specific surface area calculated from the size of particles approximating to spheres while taking the particle size distribution of particles into consideration. In short, this coefficient is an index indicating the roughness of the surfaces of particles of aluminum hydroxide and the chipping quantity. As the value of this coefficient is large, the moisture adsorption increases and the dispersibility in the resin is degraded, and the gel time is greatly delayed. On the assumption that all of the particles having a particle size distribution, obtained by the sedimentation method, are spherical, the specific surface area Sc of the particles is calculated while taking the particle size distribution into consideration.

The sphere-approximated specific surface area of a powder consisting of particles having a single diameter is determined by the formula of $6/(\rho \cdot d)$ (in which $\rho$ is 2.42 and d represents the particle diameter), but in the case of a powder having a broad particle size distribution, it is deemed proper to determine the sphere-approximated specific surface area calculated from the particle size distribution as described below.

For example, it is assumed that a particle size distribution (cumulative distribution) is obtained.

| (Particle Size) | (Cumulation of Particle Size Distribution) | (Particle Size Distribution Difference in Section) | (Sphere-Approximated Specific Surface Area) | (Specific Surface Area in Section) |
| --- | --- | --- | --- | --- |
| 1 μm | 8.8% | 8.8% | 4.96 m²/g | 0.436 m²/g |
| 1.5 | 10.8 | 2.0 | 1.96 | 0.039 |
| 2 | 16.4 | 5.6 | 1.42 | 0.080 |
| 3 | 24.9 | 8.5 | 0.99 | 0.084 |
| 4 | 34.4 | 9.5 | 0.71 | 0.067 |
| 6 | 50.4 | 16.0 | 0.5 | 0.080 |
| 8 | 63.0 | 12.6 | 0.35 | 0.044 |
| 12 | 76.3 | 13.3 | 0.25 | 0.033 |
| 16 | 85.8 | 9.5 | 0.18 | 0.017 |
| 24 | 93.8 | 8.0 | 0.12 | 0.010 |
| 32 | 98.9 | 5.1 | 0.09 | 0.005 |
| 48 | 100.0 | 1.1 | 0.06 | 0.001 |
| d₅₀ 5.9 μm | | total 100.0% | | total 0.90 m²g |

In this case, the sphere-approximated specific surface area of each section is the sphere-approximated specific surface area of the particles having a median value of the particle size in the section (the median particle size in the section of the particle size smaller than 1 μm is regarded as 0.5 μm). Sc is obtained by determining the specific surface area of each section [=ratio of difference of particle size distribution in section)×(sphere-approximated specific surface area)] and summing up the specific surface areas of all the sections.

According to the conventional process for the preparation of aluminum hydroxide, it is impossible to make the surface roughness coefficient Sr/Sc smaller than 2.5 in the region where the particle size is in the range of from 2 to 30 μm. In the conventional process, aluminum hydroxide having a particle size within this range cannot be obtained unless pulverization is carried out. At the pulverization step, particles having a large particle size are split on the cleavage surface to form plate particles, that is, high-aspect ratio particles, and therefore, the surfaces roughness coefficient inevitably increases. Namely, if it is intended to reduce the particle size in the conventional process, the surface roughness coefficient becomes large, and the viscosity of a resin composition in which such particles are filled undesirably increases.

The significance of a small surface roughness coefficient and the process for the preparation of aluminum hydroxide having a small surface roughness coefficient will be described hereinafter.

Aluminum hydroxide of the present invention has a linseed oil absorption smaller than 30 cc/100 g, preferably smaller than 25 cc/100 g, especially preferably smaller than 20 cc/100 g, as determined according to JIS K-5010. Linseed oil is sequentially added dropwise to a predetermined amount of the sample and the kneading operation is continued, and the amount of the oil required for forming the kneaded mixture into one mass with no tackiness finally is measured and designated as the linseed oil absorption. This linseed oil absorption is a criterion of the amount of aluminum hydroxide that can be filled into a resin. If this oil absorption exceeds 30 cc/100 g, the amount of aluminum hydroxide that can be filled into a resin is reduced, and it is impossible to impart a desired color, bulkiness, strength and flame retardancy to the resin composition.

Preferably, the resin filling viscosity of aluminum hydroxide of the present invention, especially one for an artificial marble article, is lower than 1000 P, particularly lower than 800 P, as measured at 35° C. The resin filling viscosity is the viscosity of a composition formed by filling 200 parts by weight aluminum hydroxide into 100 parts by weight of an unsaturated polyester resin having a viscosity of 10 P at 20° C., measured by a Brookfield viscometer at 35° C. If this resin filling viscosity exceeds 1000 P at 35° C., kneading of the resin and filler and cast molding become difficult, and the filling amount of the filler cannot be increased. Accordingly, the intended color and bulkiness cannot be obtained. Moreover, in the case of BMC or the like, the amount incorporated of a glass fiber cannot be increased, and therefore, the intended strength cannot be obtained. Furthermore, since the filler cannot be filled at a high ratio, problems such as degradation of the flow characteristics occur.

Preferably, the proportion of particles having a particle size larger than 75 μm is smaller than 1%. If this proportion exceeds this limit, the stringing property of the resin paste is degraded, and therefore, when an artificial marble article having a flow pattern is prepared by the casting method, the flow pattern is often cut midway and the surface smoothness is reduced in the molded article.

Aluminum hydroxide of the present invention for an artificial marble article should have a whiteness of at least 95. The whiteness referred to herein means the relative value of the whiteness measured by a photoelectric whiteness meter to the whiteness of magnesium oxide regarded as being 100. If the whiteness is smaller than the above-mentioned limit, the obtained molded article is colored with a light yellow or light brown tint and a color tone suitable for an artificial marble article cannot be obtained.

As the process for preparing the above-mentioned aluminum hydroxide, the present invention provides a process in which, as pointed out hereinbefore, precipitated aluminum hydroxide composed of secondary particles formed by agglomeration of primary particles having a primary particle size substantially equal to the particle size of intended pulverized aluminum hydroxide is used as the starting material to be pulverized and this precipitated aluminum hydroxide is disintegrated or pulverized.

More specifically, the present invention provides a process (first process) in which secondary agglomerated particles of aluminum hydroxide having an average particle size of less than 30 μm, preferably less than 20 μm, which are composed of primary particles having an average particle size of 1 to 4 μm, are disintegrated or pulverized so that the average particle size is reduced to 2 to 8 μm, a process (second process) in which secondary agglomerated particles of aluminum hydroxide having an average particle size of 20 to 50 μm, which are composed of primary particles having an average particle size of 4 to 8 μm, are disintegrated or pulverized so that the average particle size is reduced to 4 to 8 μm, and a process (third process) in which secondary agglomerated particles of aluminum hydroxide having an average particle size of 30 to 70 μm, which are composed of primary particles having an average particle size of 8 to 20 μm (20 μm is not included), are disintegrated or pulverized so that the average particle size is reduced to 8 to 30 μm.

The particle size of secondary agglomerated particles is measured by the sedimentation method.

The reason why the average particle size is limited to 1 to 4 μm in the first process is that, if the average particle size is outside this range, when the particles are disintegrated to an average particle size of 2 to 8 μm, the oil absorption exceeds 30 cc/100 g. The reason why the average particle size of the secondary agglomerated particles is limited to less than 30 μm is that, if the average particle size exceeds 30 μm, the disintegrating property is drastically degraded, and the average particle size of the disintegrated product is larger than 8 μm, and a problem of sedimentation arises.

The reason why the average particle size of the primary particles is limited to 4 to 8 μm in the second process is that, if the average particle size is outside this range, when the secondary agglomerated particles are disintegrated to an average particle size of 4 to 8 μm, the surface roughness coefficient exceeds 2.5 and the resin filling viscosity exceeds 1000 P. The reason why the average particle size of the secondary agglomerated particles is limited to 20 to 50 μm is that, if the average particle size is smaller than 20 μm, the particle size distribution of the disintegrated product is too narrow and the resin filling viscosity exceeds 1000 P, and if the average particle size exceeds 50 μm, the amount of the coarse particle fraction in the disintegrated product increases and the stringing property of the compound or the surface smoothness of the molded article is degraded.

The reason why the average particle size of the primary particles is limited to 8 to 20 μm (20 μm is not included) in the third process is that, if the average particle size is outside this range, when the secondary agglomerated particles are disintegrated to an average particle size of 8 to 30 μm, the surface roughness coefficient exceeds 2.5 and the resin filling viscosity exceeds 1000 P. The reason why the average particle size of the secondary agglomerated particles is limited to 30 to 70 μm is that, if the average particle size is smaller than 30 μm, the particle size distribution of the disintegrated product is too narrow and the resin filling viscosity exceeds 1000 P, and if the average particle size exceeds 70 μm, the amount of the coarse particle fraction in the disintegration product is increased and the stringing property of the compound or the surface smoothness of the molded article is degraded.

In the present invention, the primary particle size of aluminum hydroxide can be measured by the observation under an electron microscope. It was confirmed however, that a value agreeing with the value obtained by the electron microscope observation method can be obtained by the following simple method. More specifically, 15 g of aluminum hydroxide which has been allowed to stand at a temperature of 23° C. and a relative humidity of 65% is charged in a mold as shown in FIG. 1 (having a cylindrical crucible-like shape, a diameter of 30 mm and a depth of 50 mm), and a pressure of 0.75 t/cm$^2$ is applied for 30 seconds by a hydraulic press. Then, aluminum hydroxide is taken out from the mold and placed in a resin film bag, and masses are crumbled by the finger pressure. The average particle size (Blaine diameter) of the obtained disintegrated powder is measured by the air permeability method.

The particle size of secondary agglomerated particles is measured by the sedimentation method.

Secondary agglomerated particles of aluminum hydroxide having an average particle size smaller than 30 μm and composed of primary particles having an average particle size of 1 to 4 μm, secondary agglomerated particles of aluminum hydroxide having an average particle size of 20 to 50 μm and composed of primary particles having an average particle size of 4 to 8 μm, and secondary agglomerated particles having an average particle size of 30 to 70 μm and composed of primary particles having an average particle size of 8 to 20 μm (20 μm is not included), which are used in the above-mentioned first, second and third processes, respectively, can be prepared, for example, according to a process in which an aluminum salt is introduced into a solution of sodium aluminate obtained by the Bayer process disclosed in U.S. Pat. No. 2,549,549 to form an alumina gel, a part of the gel is converted to crystalline aluminum hydroxide, the obtained mixture is introduced into sodium aluminate to be decomposed, and stirring is continued to induce precipitation of fine aluminum hydroxide. Where the primary particle size of the obtained aluminum hydroxide is finer than the desired primary particle size, secondary agglomerated particles of aluminum hydroxide having the desired primary particle size can be prepared by using the obtained aluminum hydroxide as the seed crystal and decomposing a supersaturated solution of sodium aluminate.

This process for the preparation of aluminum hydroxide has not heretofore been worked. According to the conventional technique, there has been adopted, for example, a process for the preparation of aluminum hydroxide, in which of aluminum hydroxide precipitated in multiple stages of precipitation tanks, the solid precipitated in the precipitation tank of the final stage is passed through a classifying machine such as a thickener to separate coarse particles as the product, and fine particles are returned to the precipitation tank of the first stage. Namely, the seed circulation process is adopted. According to this process, it is impossible to control the primary particle size of prepared aluminum hydroxide, and the obtained secondary agglomerated particles contain primary particles having a broad particle size distribution. In contrast, according to the process of the present invention, a supersaturated solution of sodium aluminate is added while measuring the primary particle size in sequence, and the addition of the sodium aluminate solution is stopped when the desired primary particle size is attained. Therefore, aluminum hydroxide having an optional primary particle size can be prepared without problems. This means that the primary particle size can be controlled. Secondary agglomerated particles of precipitated aluminum hydroxide obtained according to the process of the present invention are characterized in that they are composed of primary particles having a very narrow particle size distribution and they do not contain coarse primary particles degrading the disintegrating property.

The reasons why the primary particle size of precipitated aluminum hydroxide has significant influences on the specific surface area of the pulverizated product or the resin filling viscosity are considered to be as follows.

Figure 2:
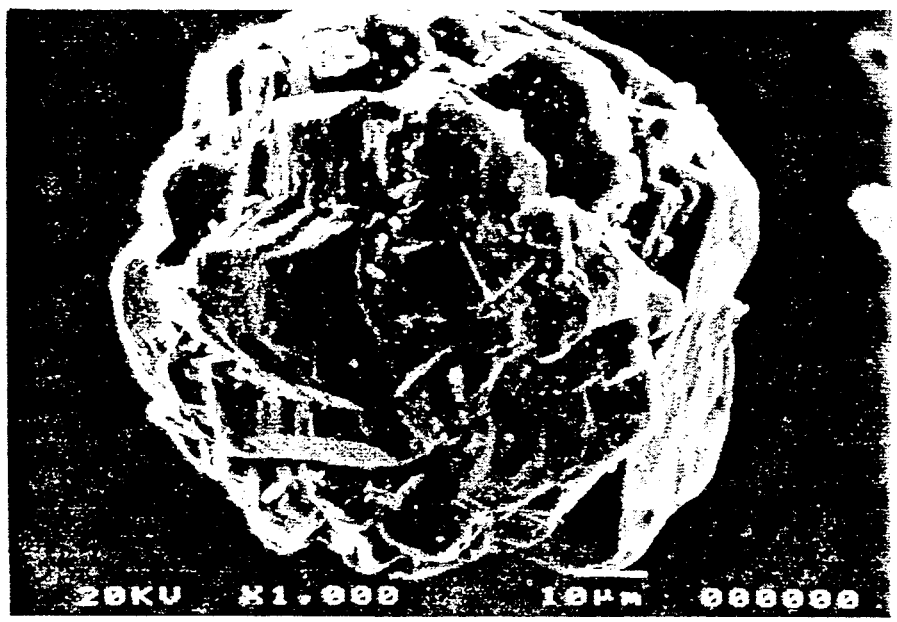
FIGS. 2 through 10 are electron microscope photos showing particle structures of aluminum hydroxide.
Figure 3:
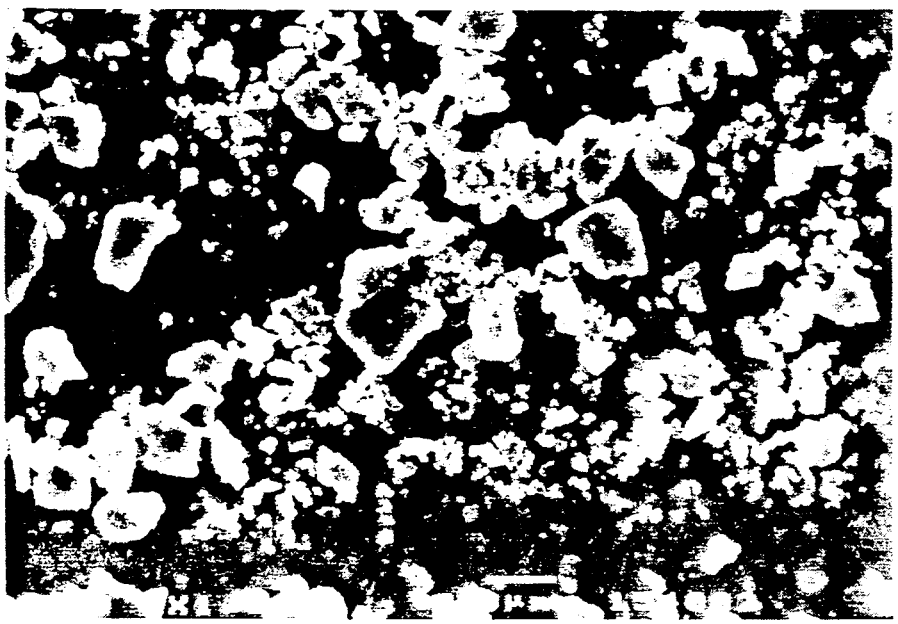
Figure 5:
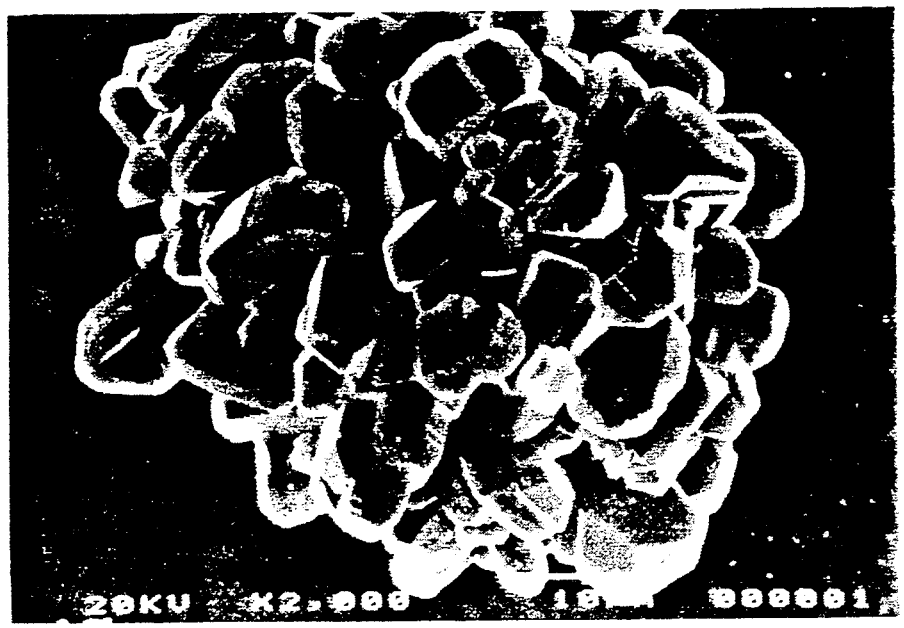
Figure 6:
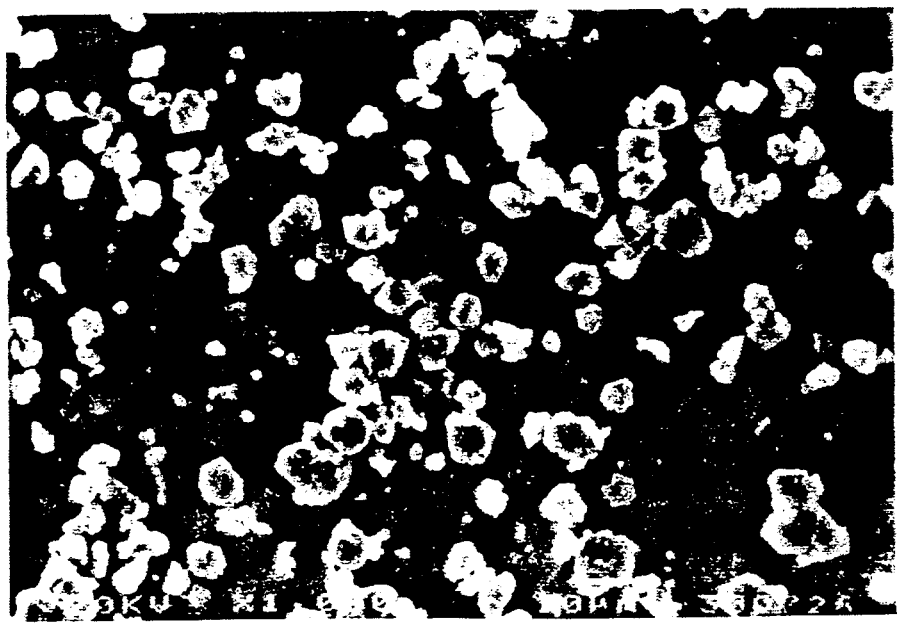

FIG. 2 is an electron microscope photo of precipitated aluminum hydroxide having an average particle size of 70 μm and an average primary particle size of 25 μm, and FIG. 3 is an electron microscope photo of aluminum hydroxide formed by pulverizing the precipitated aluminum hydroxide shown in FIG. 2 to an average particle size of 9 μm by a mill of the forced stirring type using alumina balls having a diameter of 5 mm. FIG. 5 is an electron microscope photo of precipitated aluminum hydroxide having an average particle size of 30 μm and an average primary particle size of 7 μm, and FIG. 6 is an electron microscope photo of aluminum hydroxide obtained by pulverizing the precipitated aluminum hydroxide shown in FIG. 5 to an average particle size of 6 μm by a mill of the forced stirring type using alumina balls having a diameter of 5 mm. As seen from these photos, if aluminum hydroxide having an average primary particle size of 25 μm is pulverized to an average particle size of 9 μm, destruction of primary particles should naturally take place, and therefore, because of the cleaving property of aluminum hydroxide, the particles come to have a plate-like indeterminate shape, with the result that, if this pulverized aluminum hydroxide is filled at a high ratio into a resin, the viscosity increases. Moreover, since it is necessary to destroy the primary particles, the pulverizing time becomes long, the particle surfaces are roughened and large quantities of chipped particles are formed, with the result that the specific surface area increases. In contrast, when aluminum hydroxide having an average primary particle size of 7 μm is pulverized to an average particle size of 6 μm, a disintegration of secondary agglomerated particles and destruction of primary particles is not substantially caused, and therefore, the particles obtained by disintegration sufficiently retain a round shape of primary particles of precipitated aluminum hydroxide. Accordingly, when the disintegration product is filled at a high ratio into a resin, the viscosity is low. Moreover, since the pulverizing time is short, the specific surface area is small.

The foregoing description concerns the particle size corresponding to the above-mentioned second process, but from photos of FIGS. 4 and 7 through 10, the above-mentioned holds good with respect to the particle sizes corresponding to the first and third processes.

Figure 4:
Figure 7:
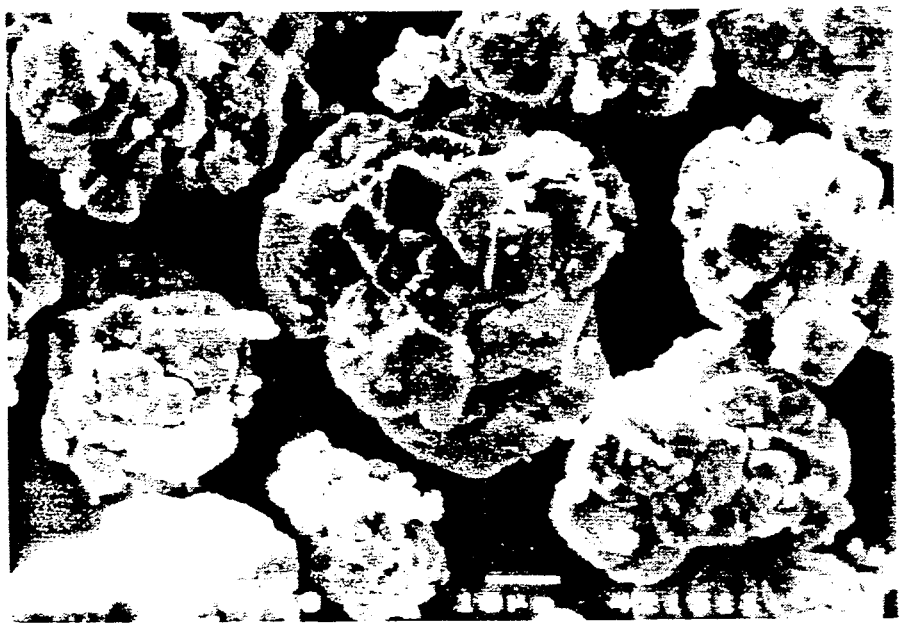
Figure 8:
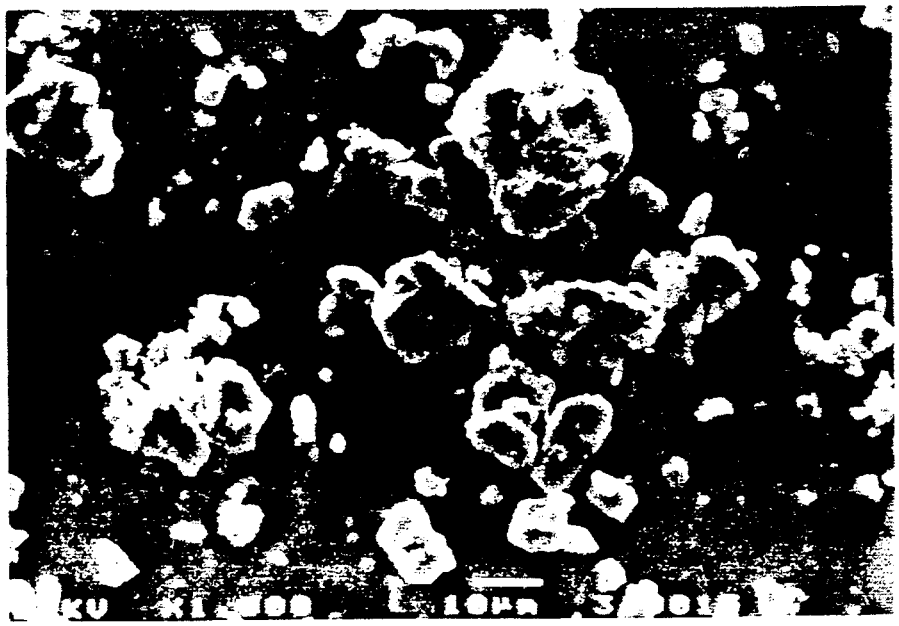

An electron microscope photo of precipitated aluminum hydroxide having an average particle size of 70 μm and an average primary particle size of 25 μm is shown in FIG. 2. FIG. 4 is an electron microscope photo of aluminum hydroxide obtained by pulverizing the aluminum hydroxide shown in FIG. 2 to an average particle size of 15 μm by a mill of the forced stirring type using alumina balls having a diameter of 5 mm. FIG. 7 is an electron microscope photo of precipitated aluminum hydroxide having an average particle size of 42 μm and an average primary particle size of 15 μm, and FIG. 8 is an electron microscope photo of aluminum hydroxide obtained by pulverizing the precipitated aluminum hydroxide shown in FIG. 7 to an average particle size of 15 μm by a mill of the forced stirring type using alumina balls having a diameter of 5 mm.

Figure 9:
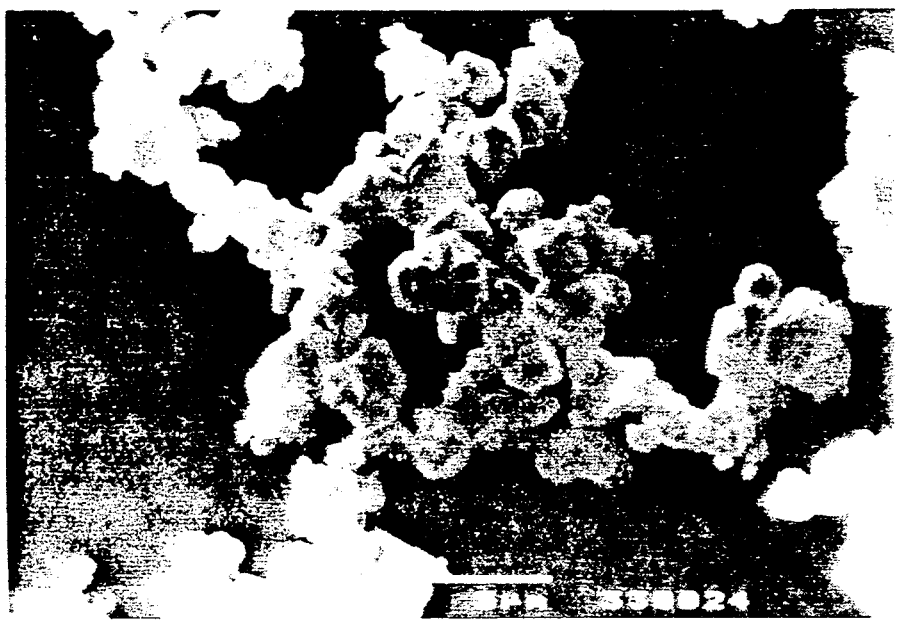
Figure 10:
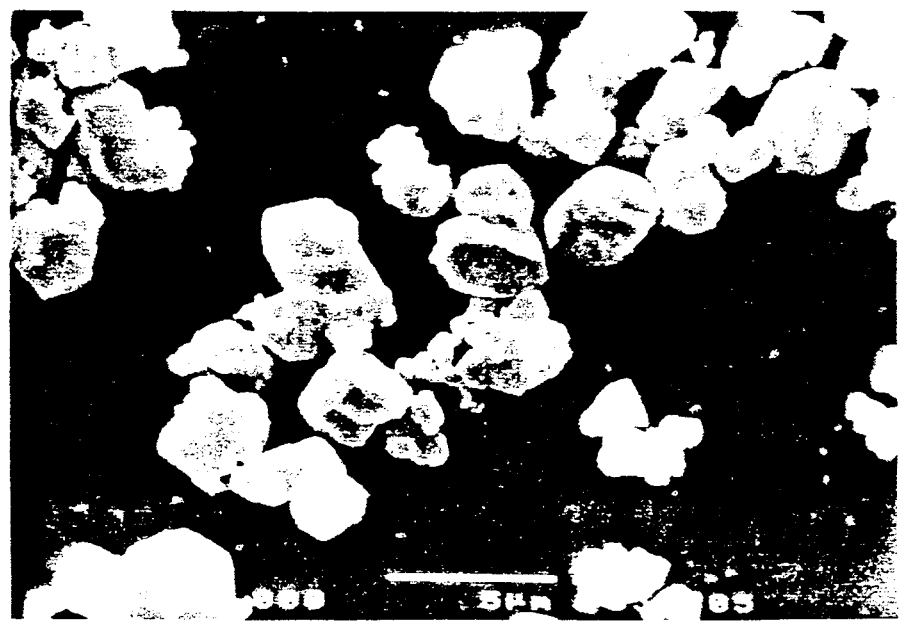

When the precipitated aluminum hydroxide having an average particle size of 70 μm and an average primary particle size of 15 μm, which is shown in FIG. 2, is pulverized to an average particle size of 15 μm or 9 μm, the particles are violently cleft to have a plate-like shape, and therefore, even if the average particle size is reduced to 3 μm, the particle shape is not improved. FIG. 9 is an electron microscope photo of precipitated aluminum hydroxide having an average particle size of 6 μm and an average primary particle size of 3 μm, and FIG. 10 is an electron microscope photo of aluminum hydroxide obtained by separating and disintegrating the precipitated aluminum hydroxide to an average particle size of 3 μm by a continuous centrifuge (Sharpless Super Decanter P-660) under application of a centrifugal force of 3000 G.

Figure 11:
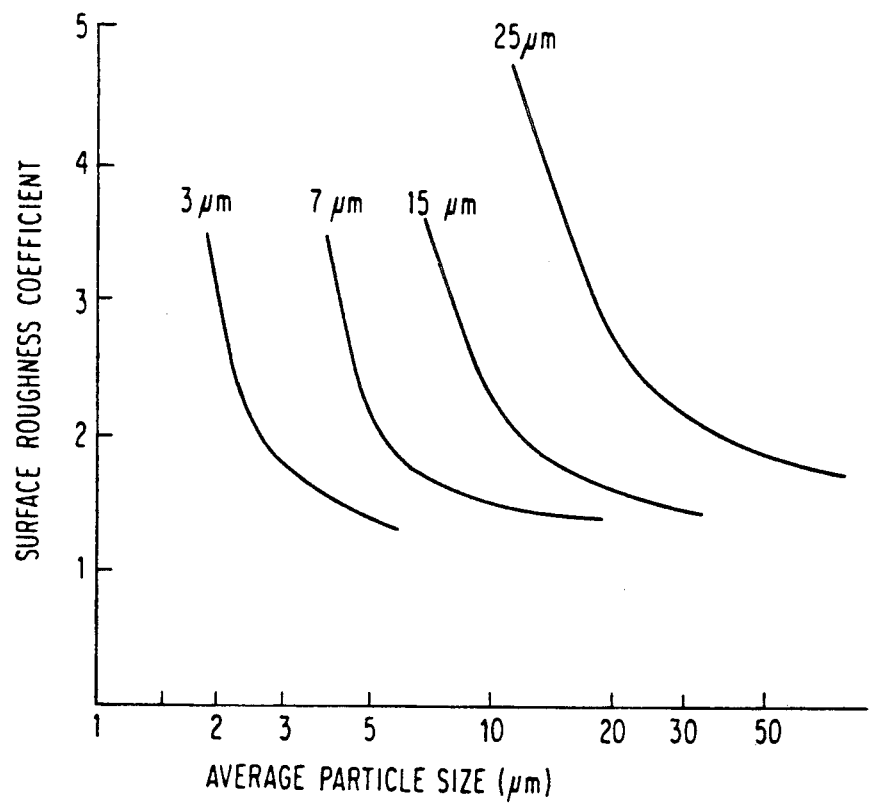
FIG. 11 is a graph illustrating the relationship between the surface roughness coefficient depending on the primary particle size and the average particle size.

FIG. 11 shows a decrease of the average particle size and increase of the surface roughness coefficient, observed when aluminum hydroxide having an average primary particle size of 3, 7 or 15 μm (the present invention) or 25 μm (conventional technique) is pulverized or disintegrated. At the initial stage of the pulverization, since disintegration of secondary agglomerated particles still occurs, an increase of the surface roughness coefficient is not significant, but the pulverization (cleavage and cracking) of primary particles gradually becomes conspicuous, and thereafter, the increase of the surface roughness coefficient is extremely conspicuous. Accordingly, it is impossible to obtain particles having a small average particle size and a small surface roughness coefficient from secondary agglomerated particles having a large primary particle size by pulverization.

Figure 12:
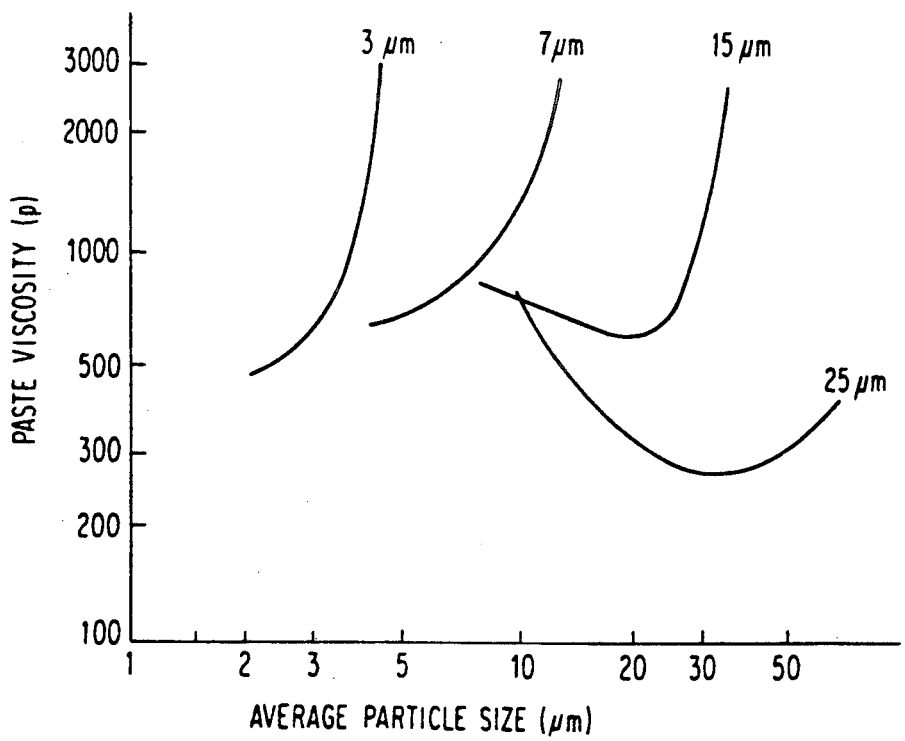
FIG. 12 is a graph illustrating the relationship between the paste viscosity depending on the primary particle size and the average particle size.

FIG. 12 shows that when aluminum hydroxide having an average primary particle size of 3, 7 or 15 μm (the present invention) or 25 μm (the conventional technique) is pulverized, the resin filling viscosity is reduced with decrease of the average particle size and the viscosity increases as the average particle size is reduced below the primary particle size. At the initial stage of the pulverization, the secondary agglomerated particles are still left and the quantity of the absorbed resin is large, and therefore, the viscosity is high. As the pulverization is advanced however, and the particle size is reduced almost to the primary particle size, the secondary agglomerated particles are not substantially left, and therefore, the viscosity is lowest. If the pulverization is further advanced, the primary particles are destroyed and the particles come to have a plate-like shape, and therefore, the viscosity increases.

The method of disintegrating secondary agglomerated particles of aluminum hydroxide is not particularly critical. For example, various disintegrating methods using a ball mill, a decanter or the like can be adopted. When the pulverization is carried out by using a ball mill, preferably the diameter of balls as the pulverizing medium is in the range of 3 to 20 mm. If the ball diameter is smaller than 3 mm, the particle size distribution of pulverized aluminum hydroxide is too narrow and the resin filling viscosity is high. If the ball diameter is larger than 20 mm, cleavage or chipping of the primary particles is increased or advanced, and therefore, the specific surface area of pulverized aluminum hydroxide is increased and good results cannot be obtained.

According to the present invention, especially in carrying out the disintegration in the above-mentioned first process, preferably, by using a continuous centrifugal separating apparatus for feeding a slurry solid by a screw conveyor rotating in a rotary drum, a centrifugal force of at least 1000 G is applied to aluminum hydroxide, and when the slurry solid is thus concentrated and separated, the secondary agglomerated particles is disintegrated to form the primary particles by the compressive shear stress between the screw conveyor and the wall surface of the drum.

Figure 13A:
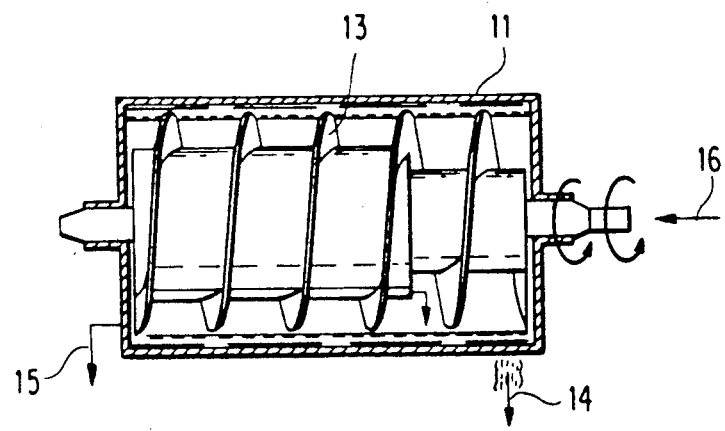
FIGS. 13A and 13B are diagrams showing a horizontal decanter continuous discharge type apparatus.
Figure 13B:
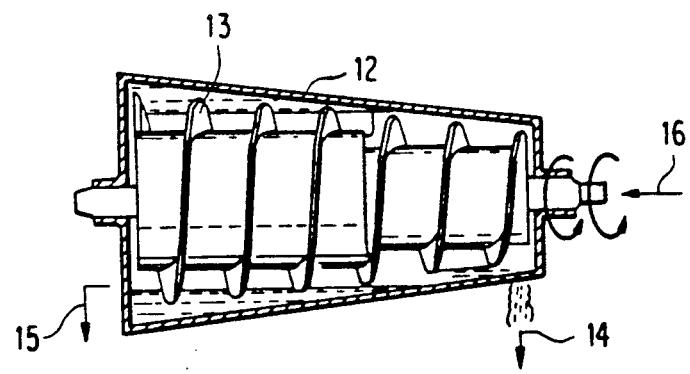

The centrifugal force applied to the aluminum hydroxide-containing slurry by the continuous centrifugal separating apparatus should be at least 1000 times the gravity (at least 1000 G). If the centrifugal force is smaller than 1000 G, the secondary agglomerated particles are not effectively disintegrated, and therefore, the oil absorption is still large. By the continuous centrifugal separating apparatus is meant an apparatus for continuously concentrating and separating a slurry by a centrifugal force, which has a function of separating the solid of the slurry in the centrifugal force-applied state. As a typical instance of this apparatus, there can be mentioned a horizontal decanter continuous discharge type separator disclosed on page 1119 of "Handbook of Chemical Engineering", 4th edition (compiled by Association of Chemical Engineering). More specifically, referring to FIGS. 13A and 13B, a rotary cylinder 11 or cone 12 is combined with a helical conveyor 13 rotating at a speed slightly different to the speed of the cylinder 11 or cone 12, and a sedimented solid 14 is separated from a clear liquid 15 and is continuously discharged. A vertical (longitudinal) apparatus of the same type also can be used in the present invention.

The mechanism of effectively disintegrating secondary agglomerated particles of aluminum hydroxide by the continuous centrifugal separating apparatus is considered to be as follows.

When a slurry 16 containing secondary agglomerated particles of aluminum hydroxide is introduced into the continuous centrifugal separating apparatus, the solid is strongly pressed to the rotary cylinder 11 or cone 12 of the centrifugal separating apparatus by the large centrifugal effect, and the secondary agglomerated particles are strongly contacted with one another. When the solid is forcibly discharged by the helical conveyor 13 rotating at a speed slightly different from the speed of the rotary cylinder 11 or cone 12 under such conditions, the secondary agglomerated particles are moved while they are strongly contacted with one another, with the result that the effect of disintegrating the secondary agglomerated particles is produced by mutual rubbing among the secondary agglomerated particles.

The disintegration by this continuous centrifugal separating apparatus is different from the conventional pulverization process utilizing the impact force by collision among media, the conventional pulverization process utilizing the attrition effect between the cylinder and roller as in a Raymond roller mill and the conventional pulverization process utilizing collision among particles as in a jet mill, and this disintegration is epoch-making in that primary crystals of aluminum hydroxide are not substantially destroyed by the disintegration.

According to the present invention, there is provided an artificial marble composition comprising 100 parts by weight of a thermosetting or thermoplastic resin capable of providing a cured product having a refractive index of from 1.47 to 1.67 and, filled therein, 100 to 400 parts by weight of aluminum hydroxide prepared in the above-mentioned manner.

The refractive index of aluminum hydroxide is 1.57, and if the refractive index of the cured resin is in the range of from 1.47 to 1.67, a marble-like molded article having a deep transparency can be provided. If the refractive index of the cured resin is outside the above-mentioned range, a deep transparency resembling that of marble cannot be given, and the composition is not suitable as an artificial marble composition.

As preferred examples of the thermosetting resin for an artificial marble product, there can be mentioned unsaturated polyester resins, polystyrene, styrene/acrylonitrile copolymers, methyl methacrylate/styrene copolymers, polydiallyl phthalate and epoxy resins. As examples of the thermoplastic resin, there can be mentioned polymethyl methacrylate, polycarbonates, polyethylene, polypropylene, polyamides and polyvinyl chloride.

The filling amount of aluminum hydroxide is 100 to 400 parts by weight per 100 parts by weight of the resin. If the filling amount of aluminum hydroxide is smaller than 100 parts by weight, the texture of the molded article is insufficient and the shrinkage by curing increases. If the filing amount of aluminum hydroxide is larger than 400 parts by weight, the resin filling viscosity is too high and the casing operation becomes impossible.

The whiteness of aluminum hydroxide as measured by a photoelectric whiteness meter should be at least 95. If the whiteness is lower than this limit, the obtained molded article is colored in a light yellow or light brown tint, and a good hue suitable for an artificial marble product cannot be obtained.

The aluminum hydroxide of the present invention having the above-mentioned characteristics is excellent as a filler for an artificial marble product. According to a preferred embodiment, a mixture comprising (A) the aluminum hydroxide of the present invention and (B) coarse aluminum hydroxide having an average particle size of 40 to 100 μm at an (A)/(B) weight ratio of from 1/9 to 9/1 is used. The particle size distribution is often too narrow if only the aluminum hydroxide (A) is used, but by mixing and using the coarse aluminum hydroxide (B), the particle size distribution is appropriately broadened and the resin filling viscosity is reduced, and therefore, operations such as kneading and casting can be facilitated. Furthermore, if the coarse aluminum hydroxide (B) is mixed and used in combination with the aluminum hydroxide (A), a molded article having a deep transparency and an appropriate hiding power can be provided. Therefore, the combined use of these aluminum hydroxides is preferable for an artificial marble composition.

The aluminum hydroxide obtained according to the present invention is valuable and significant in that simultaneous reduction of both of the specific surface area and oil absorption can be attained, though this is impossible in conventional finely divided aluminum hydroxide.

Aluminum hydroxide of the present invention having a particle size of 4 to 30 μm is especially designed as a filler for an artificial marble product, and when this aluminum hydroxide is applied to this use, excellent characteristics are exerted. For example, when this aluminum hydroxide is filled in an unsaturated polyester resin and a toilet stand or kitchen counter top is prepared by the casting molding, since the dispersibility in the resin is good, the time required for stirring and kneading is shortened. Moreover, even if the filler is incorporated at a high filling ratio for reducing the cost by decreasing the amount of the resin, since the viscosity is low, the casting operation can be performed very easily. Still further, the time required for curing an unsaturated polyester resin is much shorter than the curing time required when conventional fine aluminum hydroxide is filled, and therefore, the productivity can be improved. Moreover, since yellowing is controlled in the composition, even if a pigment is not incorporated or if a pigment is incorporated, a product having a beautiful color can be obtained.

Aluminum hydroxide of the present invention having an average particle size of 8 to 30 μm is excellent in the stringing property and therefore, when this aluminum hydroxide is used, an artificial marble product having a beautiful flow pattern can be obtained.

When a toilet stand or bathtub is prepared by the press molding of BMC or SMC, if aluminum hydroxide of the present invention is used as the filler, high-ratio filling is possible and excellent flow characteristics can be obtained at the press-molding step. Moreover, since the surface smoothness of the obtained molded article is excellent, the quality and stain resistance can be improved.

EXAMPLES

The present invention will now be described in detail with reference to the following examples that by no means limit the scope of the invention.

In Examples 1 through 6 and Comparative Examples 1 through 5 given hereinafter, aluminum hydroxide as the resin filler was evaluated with respect to the following items in composite copper-lined laminates.

(1) Varnish Viscosity

The viscosity of a composition comprising 100 parts of a curing agent-containing epoxy resin, ζparts of aluminum hydroxide and 100 parts of a solvent was measured at 25° C.

If the viscosity is higher than 10000 cP, the impregnating property in glass nonwoven fabrics is poor.

(2) Sedimenting Property

A glass nonwoven fabric having a base weight of 75 g/m$^2$ was impregnated with the above-mentioned resin varnish and dried to obtain a prepreg having a base weight of 780 g/m$^2$ (hereinafter referred to as "prepreg A"). Separately, a glass cloth having a base weight of 200 g/m$^2$ was impregnated with the curing agent-containing epoxy resin varnish and dried to obtain a prepreg having a base weight of 400 g/m$^2$ (hereinafter referred to as "prepreg B").

Three sheets of prepreg A were piled, and a copper foil having a thickness of 0.018 mm was placed on each of the surfaces of the piled prepreg assembly through one sheet of prepreg B to obtain a laminate. The laminate was interposed between metal plates and press-molded under a pressure of 50 kg/cm$^2$ at 170° C. for 100 minutes to obtain an electric laminate having a thickness of 1.6 mm.

The sedimenting property was evaluated according to the following standard.

⊚: very good (no warping of substrate at all)

○: good (warping of substrate not practically significant)

Δ: bad (warping of substrate practically serious)

If sedimentation of particles is caused at the molding step, warping of the substrate occurs.

In Examples 1 through 5 and Comparative Examples 1 through 6, a solution of sodium aluminate (Na$_2$O concentration=120 g/l, Al$_2$O$_3$ concentration=120 g/l) prepared according to the Bayer process is referred to as "aluminate solution".

EXAMPLE 1

An aqueous solution of aluminum sulfate in an amount corresponding to the neutralization equivalent was added to the aluminate solution to obtain a gel-like hydrous alumina liquid (concentration calculated as Al$_2$O$_3$: 170 g/l). This liquid was added as the seed liquid to the aluminate solution so that the seed ratio [(amount of Al$_2$O$_3$ in the seed liquid)/(amount of Al$_2$O$_3$ in the aluminate solution) × 100] was 1%, and the mixture was stirred for a whole day and night while maintaining the mixture at 60° C. A small amount of the precipitate was recovered by filtration, washed with water and dried. It was found that the obtained aluminum hydroxide had an average particle size of 2.7 μm and an average primary particle size of 1.5 μm.

The obtained slurry was subjected to solid-liquid separation by a continuous centrifugal separating apparatus (Sharpless Super Decanter P-660; the same separator was used hereinafter) while applying a centrifugal force of 2500 G. The separated cake was washed with water and passed through the filtering and drying steps.

The characteristic values of the obtained dry powder are shown in Tables 1A and 1B.

EXAMPLE 2

The aluminate solution was added to the slurry obtained in Example 1 so that the seed ratio was 10%, and the mixture was stirred for a whole day and night while maintaining the mixture at 60° C. A small amount of the precipitate was recovered by filtration, washed with water and dried. The obtained aluminum hydroxide has an average particle size of 5.4 μm and an average primary particle size of 2.6 μm.

The obtained slurry was subjected to solid-liquid separation by the continuous centrifugal separating apparatus while applying a centrifugal force of 3000 G. The separated cake was passed through the water-washing, filtering and drying steps.

The characteristic values of the obtained dry powder are shown in Tables 1A and 1B.

EXAMPLE 3

Aluminum hydroxide was prepared in the same manner as described in Example 2 except that the centrifugal force applied to the slurry was changed to 1500 G.

The characteristic values of the obtained dry powder are shown in Tables 1A and 1B.

EXAMPLE 4

The aluminate solution was added to the slurry obtained in Example 1 so that the seed ratio was 5%, and the mixture was stirred for a whole day and night while maintaining the mixture at 60° C. A small amount of the precipitate was recovered by filtration, washed with water and dried. The obtained aluminum hydroxide had an average particle size of 7.9 μm and an average primary particle size of 3.3 μm.

The obtained slurry was subjected to solid-liquid separation by the continuous centrifugal separating apparatus while applying a centrifugal force of 3000 G. The separated cake was passed through the water-washing, filtering and drying steps.

The characteristic values of the obtained dry powder are shown in Tables 1A and 1B.

EXAMPLE 5

The aluminate solution was added to the slurry obtained in Example 1 so that the seed ratio was 2%. The mixture was stirred for a whole day and night while maintaining the mixture at 60° C. A small amount of the precipitate was recovered by filtration, washed with water and dried. The obtained aluminum hydroxide had an average particle size of 11.7 μm and an average primary particle size of 3.7 μm.

The obtained slurry was subjected to solid-liquid separation while applying a centrifugal force of 3000 G. The separated cake was passed through the water-washing, filtering and drying steps.

The particle size distribution of the obtained dry powder is shown in FIG. 1A, and the characteristic values of the obtained dry powder are shown in Table 1B.

EXAMPLE 6

The slurry obtained in Example 4 was filtered by an ordinary filter, washed and dried.

The obtained dry powder was pulverized for 20 minutes by an attritor (supplied by Mitsui Miike Kako). The characteristic values of the pulverized powder are shown in Tables 1A and 1B.

TABLE 1A

| Particle Size (μm) | Particle Size Distribution and the Like Example No. | | | | | |
|---|---|---|---|---|---|---|
| | 1 | 2 | 3 | 4 | 5 | 6 |
| 1 (%) | 20.1 | 14.2 | 10.0 | 6.4 | 1.5 | 14.0 |
| 1.5 | 27.0 | 22.6 | 16.4 | 9.0 | 2.9 | 22.0 |
| 2 | 40.2 | 30.4 | 22.6 | 11.2 | 4.6 | 29.3 |
| 3 | 68.2 | 46.6 | 36.2 | 16.5 | 8.9 | 44.2 |
| 4 | 82.8 | 63.7 | 50.5 | 27.5 | 14.4 | 59.6 |
| 6 | 100.0 | 88.6 | 79.0 | 56.8 | 31.3 | 83.5 |
| 8 | | 97.7 | 93.1 | 76.6 | 50.7 | 94.6 |
| 12 | | 100.0 | 99.5 | 95.1 | 75.5 | 100.0 |
| 16 | | | 100.0 | 99.3 | 84.2 | |
| 24 | | | | 100.0 | 95.3 | |
| 32 | | | | | 98.0 | |
| 48 | | | | | 100.0 | |
| Average Particle Size (μm) | 2.1 | 3.2 | 3.9 | 5.5 | 7.9 | 3.4 |
| $S_c$ (m$^2$/g) | 1.79 | 1.43 | 1.16 | 0.8 | 0.46 | 1.39 |
| $S_R/S_c$ | 1.6 | 1.2 | 1.4 | 1.3 | 2.0 | 2.2 |

TABLE 1B

| Characteristic Values | Example No. | | | | | |
|---|---|---|---|---|---|---|
| | 1 | 2 | 3 | 4 | 5 | 6 |
| average particle size (sedimentation method) (μm) | 2.1 | 3.2 | 3.9 | 5.5 | 7.9 | 3.4 |
| sphere-approximated specific surface area $S_c$ (m$^2$/g) | 1.79 | 1.43 | 1.16 | 0.8 | 0.46 | 1.39 |
| BET specific surface area $S_R$ (m$^2$/g) | 2.8 | 1.7 | 1.6 | 1.0 | 0.9 | 3.0 |
| surface roughness coefficient $S_R/S_c$ | 1.6 | 1.2 | 1.4 | 1.3 | 2.0 | 2.2 |
| linseed oil absorption (cc/100 g) | 30 | 23 | 28 | 23 | 29 | 25 |
| moisture content (110° C., 2 hours) (%) | 0.08 | 0.05 | 0.05 | 0.04 | 0.04 | 0.24 |

TABLE 1B-continued

| Characteristic | Example No. | | | | | |
|---|---|---|---|---|---|---|
| Values | 1 | 2 | 3 | 4 | 5 | 6 |
| varnish viscosity (cp) | 9600 | 5800 | 8800 | 6100 | 9000 | 7200 |
| sedimenting property | ⓒ | ⓒ | ⓒ | c | c | ⓒ |

Comparative Example 1

An aqueous solution of aluminum sulfate in an amount corresponding to the neutralization equivalent was added to the aluminate solution to obtain a gel-like hydrous alumina liquid (the concentration calculated as $Al_2O_3$ was 170 g/l). This liquid was added as the seed liquid to the aluminate solution so that the seed ratio was 2%, and the mixture was stirred for a whole day and night while maintaining the mixture at 60° C. A small amount of the precipitate was recovered by filtration, washed with water and dried. The obtained aluminum hydroxide had an average particle size of 1.7 μm and an average primary particle size of 0.8 μm.

The obtained slurry was subjected to solid-liquid separation by the continuous centrifugal separating apparatus while applying a centrifugal force of 2800 G. The separated cake was passed through the water-washing, filtering and drying steps.

The characteristic values of the obtained dry powder are shown in Tables 2A and 2B.

Comparative Example 2

The aluminate solution was added to the slurry obtained in Example 2 so that the seed ratio was 30%, and the mixture was stirred for a whole day and night while maintaining the mixture at 60° C. A small amount of the precipitate was recovered by filtration, washed with water and dried. The obtained aluminum hydroxide had an average particle size of 20.2 μm and an average primary particle size of 5.2 μm.

The obtained slurry was subjected to solid-liquid separation by the continuous centrifugal separating apparatus while applying a centrifugal force of 3000 G. The separated cake was passed through the water-washing, filtering and drying steps.

The characteristic values of the obtained dry powder are shown in Tables 2A and 2B.

Comparative Example 3

Aluminum hydroxide was prepared in the same manner as described in Example 2 except that the centrifugal force applied to the slurry was changed to 500 G.

The characteristic values of the obtained dry powder are shown in Tables 2A and 2B.

Comparative Example 4

The slurry obtained in Example 2 was subjected to solid-liquid separation by a laboratory centrifugal separating apparatus, and the liquid was thrown away and the solid was washed and dried.

The characteristic values of the obtained dry powder are shown in Tables 2A and 2B.

Comparative Example 5

The particle size distribution of commercially available pulverized fine aluminum hydroxide (BW-703 supplied by Nippon Keikinzoku) is shown in Table 2A and the characteristic value of this aluminum hydroxide are shown in Table 2B.

TABLE 2A

| Particle Size | Particle Size Distribution and the Like | | | | |
|---|---|---|---|---|---|
| | Comparative Example No. | | | | |
| (μm) | 1 | 2 | 3 | 4 | 5 |
| 1 (%) | 35.3 | 0.0 | 6.7 | 6.4 | 11.7 |
| 1.5 | 47.7 | 0.0 | 9.8 | 8.9 | 18.8 |
| 2 | 75.5 | 0.7 | 12.9 | 11.2 | 26.1 |
| 3 | 96.7 | 2.5 | 19.0 | 16.5 | 39.3 |
| 4 | 100.0 | 5.0 | 31.1 | 27.5 | 53.7 |
| 6 | | 12.3 | 61.9 | 56.8 | 77.6 |
| 8 | | 23.4 | 80.4 | 76.6 | 89.3 |
| 12 | | 47.7 | 96.5 | 95.5 | 98.4 |
| 16 | | 65.1 | 100.0 | 99.3 | 100.0 |
| 24 | | 83.5 | | 100.0 | |
| 32 | | 91.0 | | | |
| 48 | | 97.8 | | | |
| Average Particle Size (μm) | 1.3 | 12.6 | 5.1 | 5.4 | 3.8 |
| $S_c$ (m²/g) | 2.63 | 0.25 | 0.85 | 0.80 | 1.24 |
| $S_R/S_c$ | 1.2 | 2.9 | 1.5 | 1.6 | 3.4 |

TABLE 2B

| Characteristic | Comparative Example No. | | | | |
|---|---|---|---|---|---|
| Values | 1 | 2 | 3 | 4 | 5 |
| average particle size (sedimentation method) (μm) | 1.3 | 12.6 | 5.1 | 5.4 | 3.8 |
| sphere-approximated specific surface area $S_c$ (m²/g) | 2.63 | 0.25 | 0.85 | 0.80 | 1.24 |
| BET specific surface area $S_R$ (m²/g) | 3.1 | 0.72 | 1.3 | 1.3 | 4.2 |
| surface roughness coefficient $S_R/S_c$ | 1.2 | 2.9 | 1.5 | 1.6 | 3.4 |
| linseed oil absorption (cc/100 g) | 32 | 35 | 42 | 45 | 25 |
| moisture content (110° C., 2 hours) (%) | 0.09 | 0.03 | 0.04 | 0.04 | 0.22 |
| varnish viscosity (cp) | 11000 | 12700 | 13400 | 14200 | 7500 |
| sedimenting property | ⓒ | × | c | c | ⓒ |

Examples 7 through 18 and Comparative Examples 6 through 20

In Examples 7 through 18 and Comparative Examples 6 through 20, resin/aluminum hydroxide composite compositions were evaluated in the following manner.

(1) Mixed Viscosity and (2) Dispersing Time

A composition comprising 100 parts of an unsaturated polyester resin (Rigolac 2004WM-2 supplied by Showa Kobunshi) and 200 parts of aluminum hydroxide was stirred and mixed. The time required for forming a complete paste was measured as the dispersing time, and the viscosity at this point was measured as the resin filling viscosity (at 35° C. by using a BS type viscometer). Preferably, the resin filling viscosity is lower than 1000 P and the dispersing time is shorter than 10 minutes.

(3) Color of Molded Article, (4) Gel Time and (5) Surface Smoothness of Molded Article A composition comprising 100 parts of an unsaturated polyester resin (having a refractive index of 1.52 and a viscosity of 18 P at 25° C., 1 part of MEKPO (methylethylketone peroxide marketed under the tradename of "Permek N" by Nippon Yushi), 0.2 part of 6% cobalt naphthenate and 150 parts of aluminum hydroxide was stirred and kneaded and the viscosity of the composition was continuously measured at 25° C. The gel time required for initiation of an increase of the viscosity by the curing of the resin was determined as the gel time.

Preferably the gel time is shorter than 60 minutes.

The above composition was kneaded and defoamed, cast in a mold having a diameter of 3 in and a thickness of 15 mm, cured at room temperature (25° C.) overnight, and heat-cured at 50° C. for 3 hours. The color of the cured product was measured by a color tester, Model SM-4-CH supplied by Suga Shikenki, and expressed by the Hunter color coordinates, Lab. The thus determined color was designated as the color of the molded article. The Hunter color coordinates are indicated by values of L, a and b. The axis L indicates the brightness, and a and b indicate sensible color index numbers, each including positive and negative values, and show red and green, and yellow and blue, respectively. For an artificial marble product, the value b indicating yellowness is important, and preferably, the value b is smaller than 10.

The surface smoothness of the molded article was determined by the naked eye observation. In the tables, X indicates no surface gloss, Δ indicates a poor surface gloss, and o indicates a good surface gloss.

(6) Stringing Property

A composition comprising 100 parts of an unsaturated polyester resin (having a refractive index of 1.52 and a viscosity of 18 P at 25° C.), 1 part of MEKPO (methylethylketone peroxide marketed under the trade-name of "Permek N" by Nippon Yushi), 0.2 part of 6% cobalt naphthenate, 70 parts of coarse aluminum hydroxide (70 μm) and 160 parts of fine aluminum hydroxide was stirred and kneaded and the resin slurry was scooped up by a spatula, and the state of suspension from the spatula was determined as the stringing property. The stringing property was evaluated according to the following standard:

x: suspended in the form of a mass without stringing
Δ: stringing but string cut midway
o: smoothly suspended with good stringing The results are shown in Tables 3A through 6B.

TABLE 3A

| Particle Size (μm) | Particle Size Distribution and the Like Example No. | | | | |
|---|---|---|---|---|---|
| | 7 | 8 | 9 | 10 | 11 |
| 1 (%) | 8.2 | 8.8 | 8.7 | 7.7 | 12.0 |
| 1.5 | 10.2 | 10.8 | 10.5 | 9.5 | 15.0 |
| 2 | 14.9 | 16.4 | 14.9 | 13.4 | 22.9 |
| 3 | 22.4 | 24.9 | 22.1 | 21.2 | 35.6 |
| 4 | 30.8 | 34.4 | 30.7 | 29.1 | 46.9 |
| 6 | 47.0 | 50.4 | 45.0 | 43.2 | 62.1 |
| 8 | 58.3 | 63.0 | 54.5 | 52.5 | 73.4 |
| 12 | 73.3 | 76.3 | 68.0 | 68.9 | 88.1 |
| 16 | 82.6 | 85.8 | 79.9 | 80.9 | 95.9 |
| 24 | 93.6 | 93.8 | 74.9 | 99.5 | 100.0 |
| 32 | 97.5 | 98.9 | 100.0 | 100.0 | |
| 48 | 100.0 | 100.0 | | | |
| Average Particle Size (μm) | 6.5 | 5.9 | 7.0 | 7.5 | 4.5 |
| $S_c$ (m²/g) | 0.84 | 0.90 | 0.84 | 0.80 | 1.26 |
| $S_R/S_c$ | 1.9 | 2.0 | 1.9 | 1.8 | 1.4 |

TABLE 3B

| Item | Sample | Example No. | | | | |
|---|---|---|---|---|---|---|
| | | 7 | 8 | 9 | 10 | 11 |
| Characteristics of Precipitated Aluminum Hydroxide | average particle size (μm) | 30 | 30 | 40 | 45 | 30 |
| | average primary particle size (μm) | 7 | 7 | 5 | 7 | 4.5 |
| Pulverizing Medium Diameter (mmφ) | | 5 | 10 | 10 | 5 | 5 |
| Characteristics of Pulverized Aluminum Hydroxide | average particle size (μm) | 6.5 | 5.9 | 7.0 | 7.5 | 4.5 |
| | sphere-approximated specific surface area $S_c$ (m²g/) | 0.84 | 0.90 | 0.84 | 0.80 | 1.26 |
| | BET specific surface area ($S_R$) (m²/g) | 1.6 | 1.8 | 1.6 | 1.4 | 1.8 |
| | surface roughness coefficient $S_R/S_c$ | 1.9 | 2.0 | 1.9 | 1.8 | 1.4 |
| | whiteness | 98 | 98 | 98 | 98 | 98 |
| Resin Filling Viscosity | (p) | 670 | 520 | 800 | 560 | 650 |
| Dispersing Time (minutes) | | 7 | 5 | 6 | 8 | 10 |
| Color of Molded Article | L | 68 | 71 | 73 | 67 | 74 |
| | a | −0.4 | −0.2 | −0.1 | −0.2 | −0.2 |
| | b | 7.8 | 8.1 | 7.6 | 7.9 | 8.0 |
| Gel Time (minutes) | | 50 | 45 | 42 | 55 | 50 |
| Surface Smoothness of Molded Article | | o | o | o | o | o |

TABLE 4

| Particle Size (μm) | Particle Size Distribution and the Like Comparative Example No. | | | | | | | | |
|---|---|---|---|---|---|---|---|---|---|
| | 6 | 7 | 8 | 9 | 10 | 11 | 12 | 13 | 14 |
| 1 (%) | 10.7 | 9.1 | 12.4 | 8.5 | 9.5 | 8.8 | 13.6 | 5.9 | 6.1 |
| 1.5 | 14.3 | 11.1 | 16.0 | 10.6 | 11.6 | 11.8 | 18.0 | 7.2 | 10.2 |
| 2 | 23.0 | 16.5 | 24.9 | 16.3 | 16.8 | 18.5 | 29.0 | 10.4 | 14.4 |
| 3 | 33.9 | 23.0 | 36.4 | 23.6 | 24.0 | 27.2 | 43.5 | 14.8 | 21.6 |
| 4 | 42.4 | 30.5 | 43.8 | 30.0 | 33.0 | 34.4 | 54.0 | 21.3 | 28.0 |
| 6 | 57.8 | 42.2 | 53.3 | 40.8 | 49.5 | 49.7 | 68.0 | 32.6 | 37.8 |
| 8 | 70.4 | 54.6 | 63.4 | 51.3 | 65.0 | 59.6 | 77.3 | 40.1 | 47.0 |
| 12 | 87.8 | 66.4 | 83.0 | 68.2 | 85.7 | 72.4 | 89.5 | 45.8 | 63.0 |
| 16 | 95.2 | 76.6 | 94.2 | 79.6 | 96.3 | 79.0 | 95.1 | 55.9 | 76.9 |
| 24 | 100.0 | 90.4 | 100.0 | 91.5 | 100.0 | 96.3 | 100.0 | 79.6 | 94.6 |
| 32 | | 96.3 | | 97.1 | | 99.1 | | 95.3 | 100.0 |
| 48 | | 98.5 | | 100.0 | | 100.0 | | 100.0 | |
| Average Particle Size (μm) | 5.0 | 7.3 | 5.3 | 7.7 | 6.1 | 6.0 | 3.6 | 13.7 | 8.8 |
| $S_c$ (m²/g) | 1.08 | 0.86 | 1.14 | 0.84 | 0.93 | 0.91 | 1.29 | 0.61 | 0.73 |

TABLE 4-continued

| Particle Size | Particle Size Distribution and the Like Comparative Example No. | | | | | | | | |
|---|---|---|---|---|---|---|---|---|---|
| (μm) | 6 | 7 | 8 | 9 | 10 | 11 | 12 | 13 | 14 |
| $S_R/S_c$ | 1.5 | 2.6 | 1.7 | 2.6 | 1.6 | 2.7 | 2.7 | 1.6 | 4.5 |

TABLE 4B

| Item | Sample | Comparative Example No. | | | | | | | | |
|---|---|---|---|---|---|---|---|---|---|---|
| | | 6 | 7 | 8 | 9 | 10 | 11 | 12 | 13 | 14 |
| Characteristics of Precipitated Aluminum Hydroxide | average particle size (μm) | 15 | 60 | 25 | 40 | 30 | 30 | 30 | 30 | 70 |
| | average primary particle size (μm) | 5 | 7.5 | 3.5 | 15 | 7 | 7 | 7 | 7 | 25 |
| Pulverizing Medium Diameter (mmφ) | | 5 | 5 | 10 | 5 | 2 | 30 | 5 | 5 | 20 |
| Characteristics of Pulverized Aluminum Hydroxide | average particle size (μm) | 5.0 | 7.3 | 5.3 | 7.7 | 6.1 | 6.0 | 3.6 | 13.7 | 8.8 |
| | sphere-approximated specific surface area $S_c$ (m²/g) | 1.08 | 0.86 | 1.14 | 0.84 | 0.93 | 0.91 | 1.29 | 0.61 | 0.73 |
| | BET specific surface area ($S_R$) (m²/g) | 1.6 | 2.2 | 1.9 | 2.2 | 1.5 | 2.4 | 3.5 | 1.0 | 3.3 |
| | surface roughness coefficient $S_R/S_c$ | 1.5 | 2.6 | 1.7 | 2.6 | 1.6 | 2.7 | 2.7 | 1.6 | 4.5 |
| | whiteness[*1] | 98 | 97 | 98 | 97 | 98 | 98 | 98 | 97 | 98 |
| Resin Filling Viscosity | (p) | 1800 | 420 | 2500 | 850 | 2900 | 580 | 400 | 1400 | 1600 |
| Dispersing Time (minutes) | | 15 | 25 | 30 | 25 | 45 | 17 | 95 | 7 | 60 |
| Color of Molded Article | L | 73 | 67 | 75 | 66 | 68 | 68 | 71 | 67 | 68.5 |
| | a | −0.2 | −0.1 | −0.1 | −0.2 | −0.4 | −0.4 | −0.1 | −0.2 | −0.6 |
| | b | 8.1 | 8.7 | 8.3 | 8.5 | 7.8 | 8.4 | 9.0 | 7.1 | 8.8 |
| Gel Time (minutes) | | 42 | 90 | 65 | 90 | 40 | 71 | 220 | 28 | 180 |
| Surface Smoothness of Molded Article | | c | Δ | c | Δ | c | c | c | Δ | × |

[*1] measured by powder whiteness meter, Model PWA-2 supplied by Kotaki Seisakusho

TABLE 5A

| Particle Size | Particle Size Distribution and the Like Example No. | | | | | | |
|---|---|---|---|---|---|---|---|
| (μm) | 12 | 13 | 14 | 15 | 16 | 17 | 18 |
| 1 (%) | 5.1 | 6.7 | 4.4 | 3.7 | 4.1 | 4.9 | 4.4 |
| 1.5 | 6.6 | 8.2 | 5.6 | 4.8 | 5.1 | 6.2 | 5.6 |
| 2 | 9.6 | 12.0 | 7.8 | 6.4 | 7.4 | 9.2 | 8.7 |
| 3 | 13.5 | 16.9 | 10.9 | 8.7 | 9.9 | 13.2 | 12.5 |
| 4 | 17.1 | 22.1 | 13.3 | 10.4 | 12.8 | 17.9 | 15.9 |
| 6 | 24.4 | 30.9 | 19.0 | 15.3 | 21.0 | 28.2 | 21.2 |
| 8 | 30.8 | 39.4 | 24.5 | 19.1 | 29.8 | 37.3 | 26.1 |
| 12 | 42.2 | 52.7 | 34.1 | 26.2 | 42.6 | 48.1 | 32.9 |
| 16 | 50.6 | 63.8 | 38.7 | 28.5 | 51.1 | 51.7 | 38.4 |
| 24 | 68.5 | 79.4 | 56.0 | 44.9 | 68.8 | 61.6 | 50.4 |
| 32 | 83.2 | 90.6 | 74.3 | 64.6 | 84.6 | 76.5 | 69.4 |
| 48 | 100.0 | 100.0 | 100.0 | 97.9 | 100.0 | 96.8 | 94.5 |
| 64 | | | | 100.0 | | 100.0 | 100.0 |
| 96 | | | | | | | |
| Average Particle Size (μm) | 15.7 | 11.2 | 21.2 | 26.0 | 15.4 | 14.0 | 23.7 |
| $S_c$ (m²/g) | 0.63 | 0.66 | 0.45 | 0.38 | 0.47 | 0.54 | 0.47 |
| $S_R/S_c$ | 1.6 | 2.1 | 1.8 | 1.8 | 1.7 | 1.9 | 2.1 |

TABLE 5B

| Item | Sample | Example No. | | | | | | |
|---|---|---|---|---|---|---|---|---|
| | | 12 | 13 | 14 | 15 | 16 | 17 | 18 |
| Characteristics of Precipitated Aluminum Hydroxide | average particle size (μm) | 42 | 42 | 42 | 42 | 39 | 52 | 50 |
| | average primary particle size (μm) | 15 | 15 | 15 | 15 | 12 | 10 | 17 |
| Characteristics of Pulverized Aluminum Hydroxide | average particle size (μm) | 15.7 | 11.2 | 21.2 | 26.0 | 15.4 | 14.0 | 23.7 |
| | sphere-approximated specific surface area $S_c$ (m²/g) | 0.63 | 0.66 | 0.45 | 0.38 | 0.47 | 0.54 | 0.47 |
| | BET specific surface area ($S_R$) (m²/g) | 1.0 | 1.4 | 0.8 | 0.7 | 0.8 | 1.0 | 1.0 |
| | +75 μm (%) | 0.0 | 0.0 | 0.2 | 0.8 | 0.0 | 0.0 | 0.6 |
| | surface roughness coefficient $S_R/S_c$ | 1.6 | 2.1 | 1.8 | 1.8 | 1.7 | 1.9 | 2.1 |
| | whiteness | 96 | 96.5 | 96 | 96 | 97 | 97.5 | 97.5 |
| Resin Filling Viscosity | (p) | 640 | 730 | 610 | 700 | 950 | 770 | 420 |
| Color of Molded Article | L | 62 | 64 | 60 | 58 | 66 | 73 | 63 |
| | a | −0.1 | −0.1 | −0.1 | −0.1 | −0.1 | 0.4 | −0.1 |

TABLE 5B-continued

| Item | Sample | Example No. 12 | 13 | 14 | 15 | 16 | 17 | 18 |
|---|---|---|---|---|---|---|---|---|
| | b | 7.1 | 7.9 | 6.5 | 5.7 | 8.0 | 5.3 | 6.3 |
| Gel Time (minutes) | | 38 | 55 | 30 | 23 | 25 | 34 | 36 |
| Stringing Property | | c | c | c | c | c | c | c |

TABLE 6A

Particle Size Distribution and the Like

| Particle Size (μm) | Comparative Example No. 15 | 16 | 17 | 18 | 19 | 20 |
|---|---|---|---|---|---|---|
| 1 (%) | 3.3 | 8.5 | 4.5 | 3.6 | 3.8 | 5.9 |
| 1.5 | 4.1 | 10.6 | 5.8 | 4.5 | 4.5 | 7.2 |
| 2 | 5.2 | 16.3 | 9.3 | 6.7 | 6.9 | 10.4 |
| 3 | 6.9 | 23.6 | 14.2 | 9.7 | 10.0 | 14.8 |
| 4 | 8.0 | 30.0 | 18.5 | 12.8 | 13.2 | 21.3 |
| 6 | 11.2 | 40.8 | 25.4 | 18.2 | 18.0 | 32.6 |
| 8 | 14.7 | 51.3 | 31.4 | 23.5 | 22.8 | 40.1 |
| 12 | 19.4 | 68.2 | 41.4 | 34.2 | 30.4 | 45.8 |
| 16 | 19.6 | 79.6 | 50.6 | 48.0 | 38.3 | 55.9 |
| 24 | 32.6 | 91.5 | 65.3 | 72.9 | 49.3 | 79.6 |
| 32 | 55.9 | 97.1 | 75.1 | 89.1 | 75.6 | 95.3 |
| 48 | 96.5 | 100.0 | 88.0 | 100.0 | 83.3 | 100.0 |
| 64 | 99.4 | | 92.4 | | 96.1 | |
| 96 | 100.0 | | 99.6 | | 99.7 | |
| Average Particle Size (μm) | 30.7 | 7.7 | 15.7 | 16.6 | 24.5 | 13.7 |
| $S_c$ (m²/g) | 0.32 | 0.84 | 0.51 | 0.43 | 0.41 | 0.61 |
| $S_R/S_c$ | 1.6 | 2.8 | 3.3 | 3.7 | 2.4 | 1.6 |

TABLE 6B

| Item | Sample | Comparative Example No. 15 | 16 | 17 | 18 | 19 | 20 |
|---|---|---|---|---|---|---|---|
| Characteristics of Precipitated Aluminum Hydroxide | average particle size (μm) | 42 | 42 | 75 | 72 | 76 | 29 |
| | average primary particle size (μm) | 15 | 15 | 27 | 26 | 21 | 6.8 |
| Characteristics of Pulverized Aluminum Hydroxide | average particle size (μm) | 30.7 | 7.7 | 15.7 | 16.6 | 24.5 | 13.7 |
| | sphere-approximated specific surface area $S_c$ (m²g/) | 0.32 | 0.84 | 0.51 | 0.43 | 0.41 | 0.61 |
| | BET specific surface area ($S_R$) (m²/g) | 0.5 | 2.3 | 1.7 | 1.6 | 1.0 | 1.0 |
| | +75 μm (%) | 1.5 | 0.0 | 4.2 | 0.0 | 2.3 | 0.0 |
| | surface roughness coefficient $S_R/S_c$ | 1.6 | 2.8 | 3.3 | 3.7 | 2.4 | 1.6 |
| | whiteness | 95.5 | 96.5 | 97 | 98 | 96 | 98 |
| Resin Filling Viscosity | (p) | 1050 | 870 | 410 | 3200 | 350 | 1300 |
| Color of Molded Article | L | 57 | 65 | 63 | 62 | 56 | 70 |
| | a | −0.1 | −0.1 | −0.3 | −0.1 | −0.1 | −0.1 |
| | b | 5.1 | 8.6 | 8.1 | 7.4 | 4.4 | 9.3 |
| Gel Time (minutes) | | 22 | 88 | 74 | 58 | 25 | 32 |
| Stringing Property | | Δ | c | × | c | × | c |

From the foregoing results it is seen that, since fine aluminum hydroxide of the present invention has a smaller specific surface area than those of the conventional products, the dispersibility into a resin is good, and when fine aluminum hydroxide of the present invention is filled in an unsaturated polyester resin, the delay of the gel time is effectively controlled and yellowing of the molded article is prevented. Furthermore, since the viscosity is low in the state filled in a resin, fine aluminum hydroxide of the present invention can be filled at a high loading ratio, and since the amount of residual coarse particles is small, the stringing property is good. Accordingly, when an artificial marble product having a flow pattern is prepared by the casting method, the flow pattern is not cut midway.

Industrial Applicability

Aluminum hydroxide provided according to the present invention is especially valuable for the production of an artificial marble molded article and a printed circuit board.

We claim:

1. Aluminum hydroxide for use as a resin filler, characterized by (i) an average particle size of 2 to 30 μm, (ii) a surface roughness coefficient Sr/Sc (in which Sr represents the specific surface area of particles measured by the nitrogen adsorption method and Sc represents the specific surface area calculated from the size of particles approximated to spheres while taking the particle size distribution of particles into consideration) smaller than 2.5, (iii) a linseed oil absorption smaller than 30 cc/100 g as determined according to JIS K-5101, and (iv) a resin filling viscosity as measured at 35° C. by a Brookfield viscometer with respect to a composition comprising 100 parts by weight of an unsaturated polyester resin having a viscosity of 10 poises at 20° C. and 200 parts by weight of the aluminum hydroxide.

2. Aluminum hydroxide as set forth in claim 1, wherein the surface roughness coefficient Sr/Sc is smaller than 2.

3. Aluminum hydroxide as set forth in claim 1, wherein the linseed oil absorption is smaller than 25 cc/100 g.

4. Aluminum hydroxide as set forth in claim 3, wherein the linseed oil absorption is smaller than 20 cc/100 g.

5. Aluminum hydroxide as set forth in claim 1, wherein the resin filling viscosity hydroxide is lower than 1000 poises and the proportion of particles having a particle size larger than 75 μm is smaller than by weight.

6. Aluminum hydroxide as set forth in claim 5, wherein the resin filling viscosity is lower than 800 poises.

7. Aluminum hydroxide as set forth in claim 5, wherein the whiteness is at least 95.

8. A process for the preparation of aluminum hydroxide for use as a resin filler wherein the aluminum hydroxide is characterized by (i) a surface roughness coefficient Sr/Sc (in which Sr represents the specific surface area of particles measured by the nitrogen adsorption method and Sc represents the specific surface area calculated from the size of particles approximated to spheres while taking the particle size distribution of particles into consideration) smaller than 2.5, (ii) a linseed oil absorption smaller than 30 cc/100 g as determined according to JIS K-5101 and (iii) a resin filling viscosity as measured at 35° C. by a Brookfield viscometer with respect to a composition comprising 100 parts by weight of an unsaturated polyester resin having a viscosity of 10 comprising 100 parts by weight of an unsaturated polyester resin having a viscosity of 10 poise at 20° C. and 200 parts by weight of the aluminum hydroxide, which comprises disintegrating secondary agglomerated particles of aluminum hydroxide having an average particle size smaller than 30 μm, which are composed of primary particles having an average particle size of 1 to 4 μm, so that the average particle size is reduced to 2 to 8 μm.

9. A process for the preparation of aluminum hydroxide as set forth in claim 1, which comprises disintegrating secondary agglomerated particles of aluminum hydroxide having an average particle size of 20 to 50 μm, which are composed of primary particles having an average particle size of 4 to 8 μm, so that the average particle size is reduced to 4 to 8 μm.

10. A process for the preparation of aluminum hydroxide as set forth in claim 1, which comprises disintegrating secondary agglomerated particles of aluminum hydroxide having an average particle size of 30 to 70 μm, which are composed of primary particles having an average particle size of 8 to 20 μm (20 μm is not included), so that the average particle size is reduced to 8 to 30 μm.

11. A process according to claim 8, wherein the disintegration is carried out by a ball mill using alumina balls having a diameter of 3 to 20 mm.

12. A process according to claim 9, wherein the disintegration is carried out by a ball mill using alumina balls having a diameter of 3 to 20 mm.

13. A process according to claim 10, wherein the disintegration is carried out by a ball mill using alumina balls having a diameter of 3 to 20 mm.

14. A process according to claim 8, wherein the disintegration is carried out by applying a centrifugal force of at least 1000 G to aluminum hydroxide by a continuous centrifugal separating apparatus for feeding a solid of a slurry by a screw conveyor rotating in a rotary drum, and when the solid of the slurry is concentrated and separated, the secondary agglomerated particles are disintegrated by the compressive shear stress between the screw conveyor and the wall surface of the drum.

15. An artificial marble composition comprising 100 parts by weight of a thermosetting or thermoplastic resin capable of providing a cured product having a refractive index of 1.47 to 1.67, and, filled therein, 100 to 400 parts by weight of aluminum hydroxide characterized by (i) an average particle size of 2 to 30 μm, (ii) a surface roughness coefficient Sr/Sc (in which Sr represents the specific surface area of particles measured by the nitrogen adsorption method and Sc represents the specific surface area calculated from the size of particles approximated to spheres while taking the particle size distribution of particles into consideration) smaller than 2.5, (iii) a linseed oil absorption smaller than 30 cc/100 g as determined according to JIS K-5101, (iv) a whiteness of at least 9.5, and (v) a resin filling viscosity as measured at 35° C. by a Brookfield viscometer with respect to a composition comprising 100 parts by weight of an unsaturated polyester resin having a viscosity of 10 poises at 20° C. and 200 parts by weight of the aluminum hydroxide.

16. A composition as set forth in claim 15, wherein in addition to (A) said aluminum hydroxide, (B) coarse aluminum hydroxide having an average particle size of 40 to 100 μm and a whiteness of at least 90 is further incorporated and filled so that the (A)/(B) weight ratio is in the range of from 1/9 to 9/1.

* * * * *

UNITED STATES PATENT AND TRADEMARK OFFICE
CERTIFICATE OF CORRECTION

PATENT NO. : 5,130,113
DATED : July 14, 1992
INVENTOR(S) : Kitayama et al.

It is certified that error appears in the above-identified patent and that said Letters Patent is hereby corrected as shown below:

Col. 22, line 55, after "smaller than", insert --1%--.

Signed and Sealed this

Twenty-second Day of March, 1994

Attest:

BRUCE LEHMAN

*Attesting Officer*   *Commissioner of Patents and Trademarks*